No. 819,213. PATENTED MAY 1, 1906.
O. O. FURRU.
REVERSIBLE POWER TRANSMISSION GEAR.
APPLICATION FILED MAR. 21, 1905.
2 SHEETS—SHEET 1.
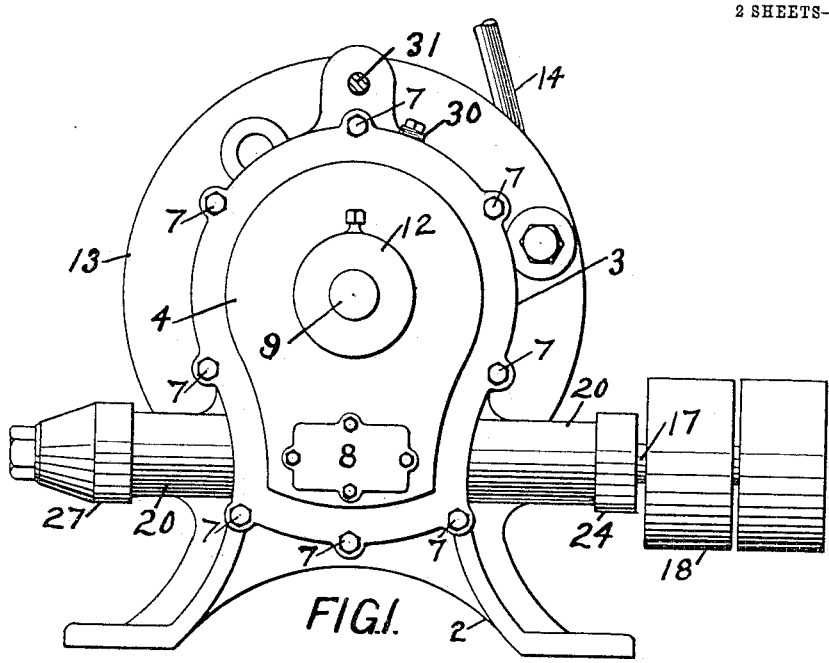
FIG.1.
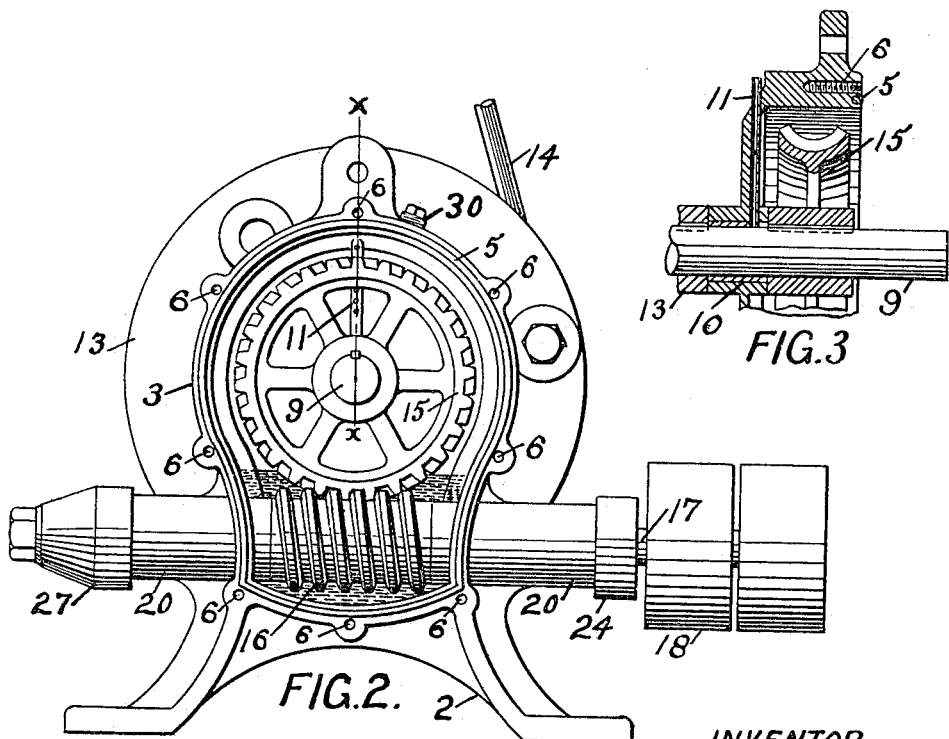
FIG.2.
FIG.3.
WITNESSES
INVENTOR
OLE O. FURRU
BY
HIS ATTORNEYS.

No. 819,213. PATENTED MAY 1, 1906.
O. O. FURRU.
REVERSIBLE POWER TRANSMISSION GEAR.
APPLICATION FILED MAR. 21, 1905.

2 SHEETS—SHEET 2.

WITNESSES
INVENTOR
OLE O. FURRU
BY
HIS ATTORNEYS.

UNITED STATES PATENT OFFICE.

OLE O. FURRU, OF ST. PAUL, MINNESOTA, ASSIGNOR OF ONE-HALF TO ELIAS CRONSTEDT, OF ST. PAUL, MINNESOTA.

REVERSIBLE POWER-TRANSMISSION GEAR.

No. 819,213.     Specification of Letters Patent.     Patented May 1, 1906.

Application filed March 21, 1905. Serial No. 251,214.

*To all whom it may concern:*

Be it known that I, OLE O. FURRU, of St. Paul, Ramsey county, Minnesota, have invented certain new and useful Improvements in Reversible Power-Transmission Gears, of which the following is a specification.

My invention relates to reversible or interchangeable gearings for a power-transmission gear applicable for various purposes, but designed particularly for use in connection with a pump-jack or a pump-rod for operating the same.

The object of my invention is to provide a gearing which can be easily and quickly reversed when it is desired to apply the power on the other side of the machine.

A further object is to provide a gearing in which the friction is reduced to a minimum and in which there are but few parts, and these are easily accessible for examination or for repairs.

A further object is to provide a power-transmission device capable of being attached to a pump-jack or directly to the pump-rod, as preferred.

The invention consists generally in various constructions and combinations, all as hereinafter described, and particularly pointed out in the claims.

Figure 4:
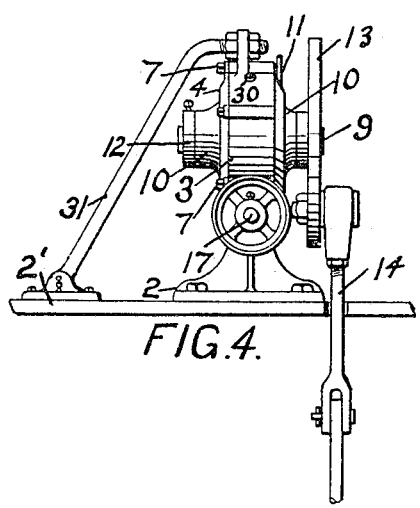
Figure 5:
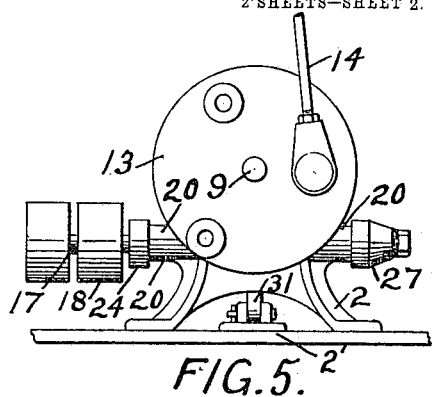
Figure 7:
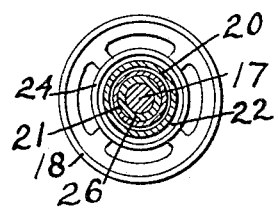
Figure 6:
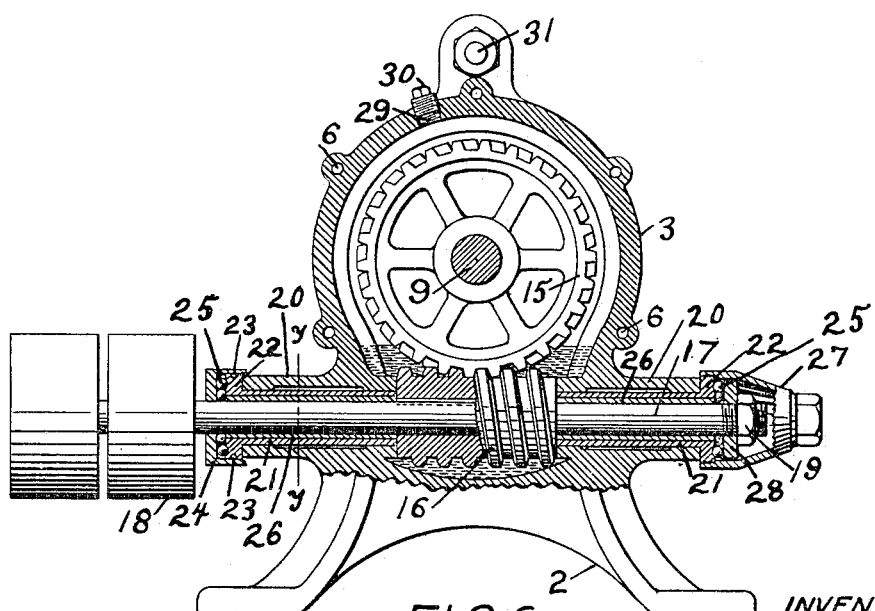

In the accompanying drawings, forming part of this specification, Figure 1 is a front view of a power-transmission device having a reversible gearing embodying my invention. Fig. 2 is a similar view with the cover removed, showing the interior of the casing. Fig. 3 is a sectional view on the line *x x* of Fig. 2. Fig. 4 is an edge view of the device, illustrating its application to a pump-rod direct. Fig. 5 is a face view of the disk or plate to which one end of the pitman-rod connecting said disk and the pump-jack is attached. Fig. 6 is a vertical section through the apparatus, showing in detail the reversible gearing. Fig. 7 is a sectional view on the line *y y* of Fig. 6.

In the drawings, 2 represents a suitable base whereon the casing 3, inclosing the operating parts of the mechanism, is mounted. This casing is provided on one side with a removable cover-plate 4, between which and the walls of the casing a gasket or packing-ring 5 is provided to form an oil and dust proof joint at this point. Threaded holes 6 are preferably provided in the casing to receive the bolts 7, by which the said cover is secured. Upon removing this cover-plate the interior of the casing is visible, and when it is only desired to expose or examine the worm-shaft a smaller cover 8, fitting over a hole in the larger cover-plate 4, is provided, which upon being removed allows the worm-shaft to be seen.

Within the casing 3 is a shaft 9, having bearings 10 at each end that communicate with an air-vent 11. An adjustable collar 12 is provided on one end of said shaft and a disk 13 on the other end, to which a pitman 14 is pivotally connected, as shown in Figs. 4 and 5, and in one case extends downwardly and is attached to the pump-rod and in the other upwardly to the pump-jack. In one case the power is applied directly from the gear to the pump-rod, the gear being located above the pump, while in the other case the gear is located below or on the same level as the pump and is connected with its rod through an intermediate jack device.

Within the casing 3 a shaft 9 is provided with a worm-wheel 15, that meshes with a worm 16, that is keyed on a shaft 17. A driving-pulley 18 is provided at one end of this shaft, and the other end is threaded to receive a lock-nut 19. Boxes 20 are provided on each side of said casing, through which said shaft 17 extends. A sleeve 21 fits within the box at the pulley end of said shaft and has a flange 22 at its outer end provided with a packing-ring 23, over which a cap 24, secured on said shaft, extends. A ball-bearing 25 is provided between said cap and flange, and between said sleeve a shaft and bearing-ring 26 are inserted. A similar flanged sleeve is provided in the opposite box, except that instead of having a packing-ring the periphery of the flange is threaded to receive a cap 27, that covers the threaded end of the shaft 17, and upon said threaded end a washer 28 is provided, between which and said sleeve a ball-bearing similar to the one above described is located. By means of the lock-nut these bearings can be adjusted and all wear and lost motion taken up.

The bearings are interchangeable, so that whenever desired the lock-nut can be removed and the shaft 17 reversed to bring its driving-pulley on the opposite side of the machine. The threaded cap and the packing-rings at the ends of the sleeves form dust-proof joints and also prevent any escape of oil from the interior of the casing. A bearing-sleeve similar to the one described is arranged at the threaded end of the shaft 17 and is readily removable upon taking off the cap 27 and the lock-nut.

The upper part of the casing 3 is provided with an oil-hole 29 and plug 30, through which oil can be poured into the interior of the casing and up to a certain predetermined level therein to cover the worm and the lower portion of the worm-wheel, and this oil will flow down around the bearings and into the boxes 20 and penetrate as far as the ball-bearings at the ends of the shaft. A thorough lubrication of the parts will thus be insured and the friction and wear of the moving parts reduced to a minimum. A brace-rod 31 preferably connects the platform 2' with the top of the casing to brace and strengthen the same and equalize in a large degree the strain on the operating parts.

I claim as my invention—

1. The combination, with a casing provided with bearing-boxes, of a worm-wheel mounted in said casing, a worm engaging said wheel, a shaft fitting within said worm, bearing-sleeves interposed between said shaft and boxes and having flanged outer ends, caps fitting over said flanges and forming dust and oil proof joints therewith, ball-bearings provided between said caps and sleeves, and said worm and worm-wheel operating in a chamber adapted to contain a body of oil and communicating with said ball-bearing through said bearing-sleeves, substantially as described.

2. The combination, with a casing provided with bearing-boxes, of a worm-wheel mounted in said casing, a worm engaging said wheel, a shaft whereon said worm is mounted, said shaft having a driving-pulley at one end and a thread and lock-nut at the other end, bearing-sleeves provided within said boxes and between them and said shaft, a cap secured on the driving-pulley end of said shaft, and ball-bearings interposed between said bearing-sleeves and said cap and said lock-nut, substantially as described.

3. The combination, with a worm-wheel, of a worm, a shaft whereon said worm is mounted, one end of said shaft being provided with a thread and lock-nut, bearing-boxes provided on each side of said worm, sleeves having flanged outer ends fitting within said boxes, bearing-sleeves arranged between said flanged sleeves and said shaft, a cap secured on said shaft and inclosing the flanged end of one of said sleeves and forming a dust-proof joint therewith, a cap inclosing the threaded periphery of the flange on the opposite sleeves, ball-bearings provided between said caps and said sleeves, and a driving-pulley mounted on said shaft.

4. The combination, with a worm-wheel, of a worm and its shaft fitting therein, bearing-boxes on each side of said worm, a thread and lock-nut provided on one end of said shaft, a driving-pulley on the other end of said shaft, removable bearing-sleeves fitting within said boxes between them and said shaft, a cap secured on said shaft near said driving-pulley, a ball-bearing interposed between said cap and said lock-nut and said bearing-sleeves, substantially as described.

5. The combination, with a worm-wheel and its shaft, of a worm, a driving-shaft therefor, a driving-pulley mounted on said shaft, a disk secured on said worm-wheel shaft, a pitman-rod pivotally connected to one end of said disk, and said driving-shaft being removable from said worm and reversible therein to allow said worm to be driven from either side of the machine.

6. The combination, with a worm-wheel and its shaft, of a worm engaging said wheel, a shaft removably fitting within said worm, bearing-boxes at each end of said worm, sleeves fitting within said boxes and inclosing said shaft, a fixed cap mounted on said shaft at one end of one of said boxes, a driving-pulley also mounted on said shaft near said cap, and said shaft being provided near the outer end of the opposite bearing-sleeve with a thread and an adjustable lock-nut whereby said shaft can be moved longitudinally to adjust said sleeves, and antifriction-bearings provided between said fixed sleeves and said cap and said lock-nut, substantially as described.

7. The combination, with a casing provided with bearing-boxes and having a chamber adapted to contain a body of oil, of a worm-wheel having its shaft journaled in the walls of said casing and revolving in said chamber, a worm engaging said wheel and also revolving in said chamber, a driving-shaft fitting within said worm and journaled in said boxes, a driving-pulley mounted on said shaft, ball-bearings at the outer ends of said boxes having dust and oil proof joints and communicating through said boxes with said oil-chamber, and said driving-shaft being reversible in said worm, for the purpose specified.

8. The combination, with a casing provided with bearing-boxes, of a worm-wheel journaled in said casing, a worm engaging said wheel, a driving-shaft journaled in said boxes and passing through said worm, bearing-sleeves inclosing said driving-shaft, an antifriction-bearing arranged to take up the end thrust of said shaft, and means for adjusting said shaft lengthwise to take up the wear in said bearings, substantially as described.

9. The combination, with a casing provided with bearing-boxes and a chamber adapted to contain a body of oil, of a worm-wheel having its shaft mounted in the walls of said casing and revolving in said oil-chamber, a worm engaging said wheel and also revolving in said chamber, a driving-shaft journaled in said boxes and on which shaft said worm is mounted, ball-bearings arranged to take up the lengthwise thrust of said shaft and communicating through said boxes with said oil-chamber.

10. The combination, with a casing provided with bearing-boxes, of a worm-wheel mounted in said casing, a worm engaging said wheel, a driving-shaft journaled in said boxes and on which shaft said worm is mounted, a driving-pulley for said shaft, and anti-friction-bearings provided at the outer ends of said boxes and arranged to take up the lengthwise thrust of said shaft and means for adjusting said shaft lengthwise.

In witness whereof I have hereunto set my hand this 11th day of March, 1905.

OLE O. FURRU.

Witnesses:
RICHARD PAUL,
C. MACNAMARA.